(12) United States Patent
Kato

(10) Patent No.: US 12,361,527 B2
(45) Date of Patent: Jul. 15, 2025

(54) APPARATUS, LENS APPARATUS, AND STORAGE MEDIUM FOR PERFORMING SIGNAL PROCESSING FOR A SIGNAL USING A CORRECTION VALUE

(71) Applicant: CANON KABUSHIKI KAISHA, Tokyo (JP)

(72) Inventor: Tatsuro Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 18/189,920

(22) Filed: Mar. 24, 2023

(65) Prior Publication Data

US 2023/0316469 A1    Oct. 5, 2023

(30) Foreign Application Priority Data

Mar. 30, 2022 (JP) ................. 2022-056681

(51) Int. Cl.
　　*G06T 5/80*　　(2024.01)
　　*G02B 7/36*　　(2021.01)
　　*H04N 23/67*　　(2023.01)
　　*H04N 23/82*　　(2023.01)

(52) U.S. Cl.
　　CPC .............. *G06T 5/80* (2024.01); *G02B 7/36* (2013.01); *H04N 23/672* (2023.01); *H04N 23/82* (2023.01)

(58) Field of Classification Search
　　None
　　See application file for complete search history.

(56) References Cited

U.S. PATENT DOCUMENTS

| 5,367,153 A | * | 11/1994 | Suda | ........................ G02B 7/28 396/114 |
| 2015/0365639 A1 | * | 12/2015 | Ogawa | ................. H04N 25/683 348/272 |
| 2018/0176494 A1 | * | 6/2018 | Sambonsugi | .......... H04N 23/84 |

FOREIGN PATENT DOCUMENTS

JP    H04-256917 A    9/1992

* cited by examiner

*Primary Examiner* — Quan Pham
(74) *Attorney, Agent, or Firm* — Canon U.S.A., Inc. IP Division

(57) ABSTRACT

An apparatus includes a processing unit configured to perform signal processing for a signal from a sensor using a correction value that is different for each pixel of the pair of signals, and a calculating unit configured to perform a correlation calculation for the signal output from the processing unit. The processing unit performs a weighted sum for adjacent pixels using the correction value.

10 Claims, 9 Drawing Sheets

| A-IMAGE | A1 | A2 | A3 | A4 | A5 | A6 | A7 | A8 | A9 |
| B-IMAGE | B1 | B2 | B3 | B4 | B5 | B6 | B7 | B8 | B9 |

CORRECTION VALUE C | 1.2 | 1.1 | 1.0 | 0.9 | 0.8 | 0.7 | 0.6 | 0.5 | 0.4

PIXEL CENTER-OF-GRAVITY MOVING AMOUNT C/2 | 0.6 | 0.55 | 0.5 | 0.45 | 0.4 | 0.35 | 0.3 | 0.25 | 0.2

PIXEL CENTER-OF-GRAVITY MOVING AMOUNT (POST-OFFSET) | 0.2 | 0.15 | 0.1 | 0.05 | 0 | -0.05 | -0.1 | -0.15 | -0.2

APPARATUS, LENS APPARATUS, AND STORAGE MEDIUM FOR PERFORMING SIGNAL PROCESSING FOR A SIGNAL USING A CORRECTION VALUE

BACKGROUND

Technical Field

One of the aspects of the embodiments relates to a control apparatus, a lens apparatus, an image pickup apparatus, and a storage medium.

Description of the Related Art

An imaging apparatus for performing phase difference autofocus (AF) has conventionally been known. In this AF, images are formed on a pair of sensors using light beams divided on a pupil plane through a pair of lenses, a correlation calculation is performed based on the signals of the obtained two images, and a phase shift amount corresponding to an image shift amount between these two images is calculated. Any lens manufacturing errors or sensor attachment errors cause this AF to contain a difference in phase difference amount in each area on the sensor due to the influence of distortion in an object image on the sensor.

Japanese Patent Laid-Open No. (JP) 4-256917 discloses a method of correcting the distortion using a single correction value representing a correlation calculating area.

In a case where the distortion in the object image is large, the variation in the phase difference amount within the correlation calculating area is also large. Therefore, the distortion cannot be sufficiently corrected with the single correction value representing the correlation calculating area as disclosed in JP 4-256917. As a result, it is difficult to perform precise focusing.

SUMMARY

An apparatus according to one aspect of the embodiments includes at least one processor and a memory coupled to the at least one processor storing instructions that, when executed by the at least one processor to function as a processing unit configured to perform signal processing for a signal from a sensor using a correction value that is different for each pixel of the signal, and a calculating unit configured to perform a correlation calculation for the signal output from the processing unit. The processing unit performs a weighted sum for adjacent pixels using the correction value.

Alternatively, the processing unit performs a weighted sum for adjacent pixels using a value obtained by subtracting an offset amount from the correction value, and the calculating unit adds the offset amount to a phase difference amount obtained by the correlation calculation. A lens apparatus or an image pickup having the above apparatus also constitutes another aspect of the embodiments. A non-transitory computer-readable storage medium storing a program for causing a computer to execute a control method. The control method includes performing signal processing for a signal from a sensor using a correction value that is different for each pixel of the pair of signals, and performing a correlation calculation for the signal output from the performing signal processing. The performing signal processing performs a weighted sum for adjacent pixels using the correction value. Alternatively, the performing signal processing performs a weighted sum for adjacent pixels using a value obtained by subtracting an offset amount from the correction value, and the performing correlation calculating adds the offset amount to a phase difference amount obtained by the correlation calculation.

DESCRIPTION OF THE EMBODIMENTS

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
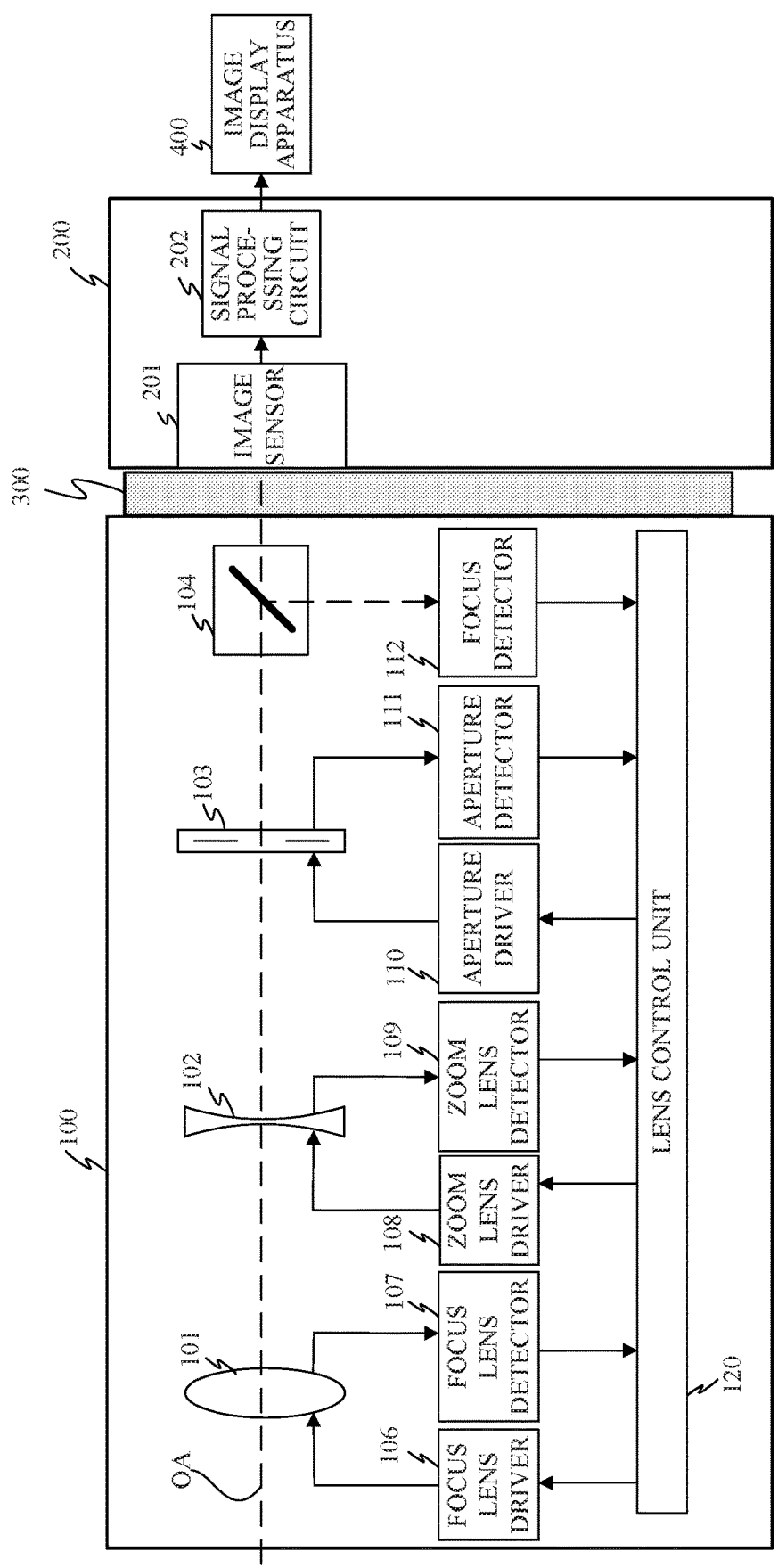
FIG. 1 is a block diagram of an imaging system according to a first embodiment.

Referring now to FIG. 1, a description will be given of an imaging system according to a first embodiment. FIG. 1 is a block diagram of an imaging system 10. The imaging system 10 includes a camera body (image pickup apparatus) 200 and a lens apparatus 100 attachable to and detachable from the camera body 200. The lens apparatus 100 and camera body 200 are mechanically and electrically connected via a mount 300, which is a coupling mechanism. This embodiment is also applicable to an image pickup apparatus in which a camera body and a lens apparatus are integrated with each other.

The lens apparatus 100 includes an imaging optical system. The imaging optical system includes a focus lens 101 for first focusing, a zoom lens 102 for varying magnification, an aperture unit (aperture stop unit or diaphragm unit) 103 for adjusting a light amount, and a splitting prism (splitter) 104 for splitting light.

The focus lens 101 is moved in a direction along an optical axis OA (optical axis direction) by a focus lens driver (focus lens driving unit) 106. A focus lens detector (focus lens detecting unit) 107 detects a position of the focus lens 101. The zoom lens 102 is moved in the optical axis direction by a zoom lens driver (zoom lens driving unit) 108. A zoom lens detector (zoom lens detecting unit) 109 detects a position of the zoom lens 102. The aperture unit 103 includes aperture blades. An aperture driver (aperture driving unit) 110 drives the aperture unit 103 for a light amount adjusting operation. An aperture detector (aperture detecting unit) 111 detects an F-number (aperture value) of the aperture unit 103.

Each of the focus lens driver 106, the zoom lens driver 108, and the aperture driver 110 includes an ultrasonic motor (vibration wave motor), for example. However, this embodiment is not limited to this example, and may use another motor such as a voice coil motor, a DC motor, or a stepping motor. Each of the focus lens detector 107, zoom lens detector 109, and aperture detector 111 includes, for example, a potentiometer or an encoder.

The splitting prism 104 separates (divides or splits) the light that has passed through the aperture unit 103 into transmitting light and reflected light. The light (transmitting light) that has passed through the splitting prism 104 enters an image sensor 201 in the camera body 200. The light (reflected light) reflected by the splitting prism 104 enters the focus detector 112. The focus detector 112 calculates a phase difference amount by performing a correlation calculation for a pair of image signals, and converts it into a defocus amount. A lens control unit 120 drives the focus lens 101 and controls the zoom lens 102 and the aperture unit 103 based on the defocus amount obtained by the focus detector 112.

The image sensor 201 includes a CMOS sensor, a CCD sensor, or the like, and photoelectrically converts an optical image (object image) formed by the imaging optical system of the lens apparatus 100. The signal processing circuit 202 generates an image signal by performing signal processing for an electrical signal output from the image sensor 201 and outputs an image signal to the image display apparatus 400. Thereby, the image display apparatus 400 can display an image.

Figures 2, 3:
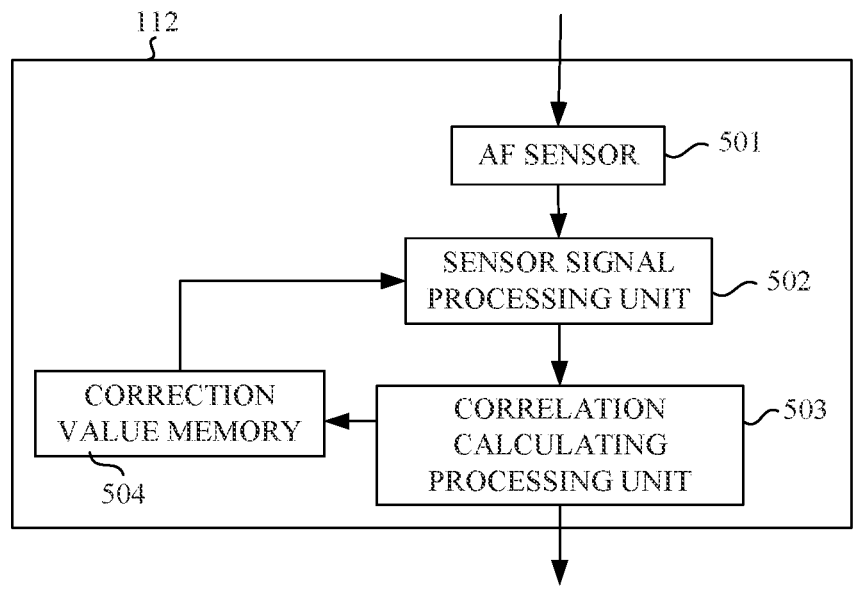
FIG. 2 is a block diagram of a focus detector in the first embodiment.
FIG. 3 explains pixel columns of an A-image and a B-image in the first embodiment.

Referring now to FIG. 2, a description will be given of the focus detector (control apparatus) 112. FIG. 2 is a block diagram of the focus detector 112. The light reflected by the splitting prism 104 is split into two beams by a pair of phase difference detecting lenses (not illustrated). An AF sensor 501 includes a pair of image sensors that photoelectrically convert a pair of images (two images or an A-image and a B-image) formed by the two split light beams and generates image signals of the two images. A sensor signal processing unit (signal processing unit) 502 performs signal processing for the image signals of the two images. A correlation calculating processing unit (correlation calculating unit) 503 performs correlation calculation using two image signals from the sensor signal processing unit 502. A correction value memory (correction value storage unit) 504 stores a correction value for correcting a shift amount between the two images, which will be described below. The sensor signal processing unit 502 corrects the image signals of the two images using correction values read out of the correction value memory 504.

Referring now to FIG. 3, a description will be given of the calculation by the correlation calculating processing unit 503. FIG. 3 explains pixel columns of the A-image and the B-image. As illustrated in FIG. 3, the correlation calculating processing unit 503 performs correlation calculation using the pixel columns of the A-image and the B-image that form a pair. In the correlation calculation, the correlation calculating processing unit 503 obtains the correlation amount by adding the absolute values of the differences between the pixel signals of the A-image and the B-image over the correlation calculating area. The correlation amount is calculated by fixing one of the A-image and the B-image, by shifting the other by one pixel unit, and by performing the calculation for each shift number k. The correlation amount COR(k) is expressed by the following equation (1):

$$COR(k) = \sum_{i} |A_i - B_{i+k}| \qquad (1)$$

where k is the number of shifts.

In Equation (1), $A_i$ and $B_i$ are an i-th pixel value of the A-image and an i-th pixel value of the B-image, respectively. When the correlation amount COR(k) is maximized in a case where the number of shifts k is changed, the signals of the A-image and the B-image are most accurately matched (in-focus state). The resolution of the shift number k that can be calculated by this calculation is one pixel unit. Accordingly, in order to calculate the number of shifts k with a resolution of less than one pixel, a correlation amount difference ΔCOR(k) between the two images in a case where k pixels are shifted is calculated by the following equation (2) using a correlation amount COR(k) in a case where k pixels are shifted and a correlation amount COR(k+1) in a case where (k+1) pixels are shifted:

$$\Delta COR(k) = \{COR(k) - COR(k+1)\} \qquad (2)$$

The shift number k that maximizes the correlation amount COR(k) means an in-focus point and can be calculated at the zero cross point where the correlation amount difference ΔCOR(k) changes from negative to positive. This shift number k is referred to as a phase difference amount. The correlation calculating processing unit 503 converts the obtained phase difference amount into a defocus amount and outputs the defocus amount to the lens control unit 120. The lens control unit 120 calculates a focus lens driving amount based on the defocus amount and drives the focus lens 101.

Figure 4A:
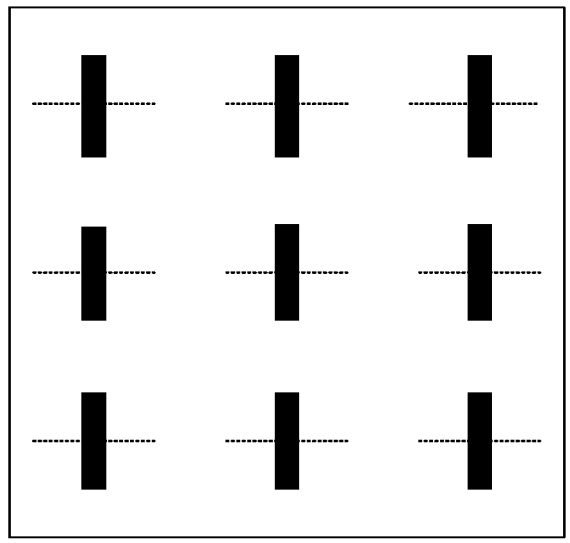
FIGS. 4A and 4B explain an image shift at each position on an AF sensor in the first embodiment.
Figure 4B:
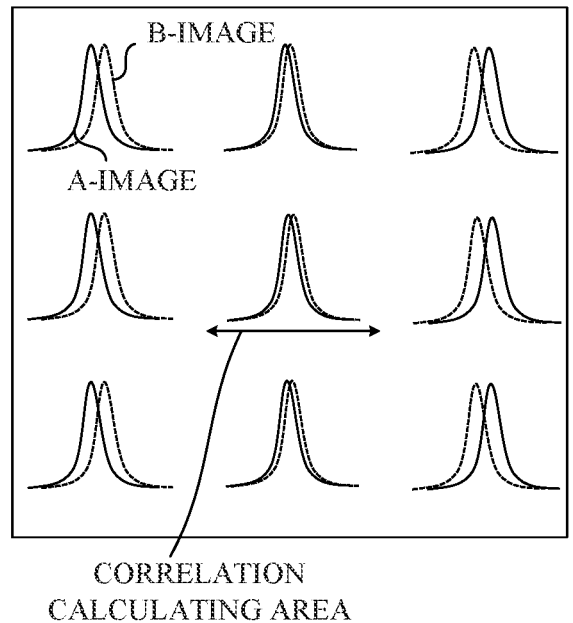

Referring now to FIGS. 4A, 4B, 5A, and 5B, a description will be given of a shift between two images formed at each position on the AF sensor 501. FIGS. 4A and 4B explain an image shift at each position on the AF sensor 501. FIG. 4A illustrates objects in an image of the image display apparatus 400. FIG. 4B illustrates the signal levels of the two images when the objects in FIG. 4A are imaged on the AF sensor 501, and illustrates each signal level corresponding to each dotted line in FIG. 4A. In FIG. 4B, a solid line indicates the A-image, and a broken line indicates the B-image. In this embodiment, a horizontal direction in FIG. 4B is a correlation direction. In FIG. 4B, shift amounts between the two images formed at nine points on the AF sensor 501 are different for each position, and a phase difference amount obtained as a result of the correlation calculation for each position is also different. This variation is caused by a difference between an optical distance from a branching optical system (splitting prism 104) to the AF sensor 501 and an optical distance from the branching optical system to the imaging plane, the accuracy of the installation position of the AF sensor 501, and the like.

Conventionally, a shift amount between two images in the correlation calculating area illustrated in FIG. 4B is treated as a negligible amount. Accordingly, a correction value for a certain correlation calculating area (a phase difference amount in the in-focus state), for example, has been able to be regarded as a correction value at the center pixel position in the correlation calculating area and a single correction value has been able to be regarded as a representative correction value for the entire correlation calculating area. In this case, correction processing for correcting a shift amount between the two images at each position of the AF sensor 501 can use processing of subtracting the correction value from the phase difference amount of the correlation calculation result.

Figure 5A:
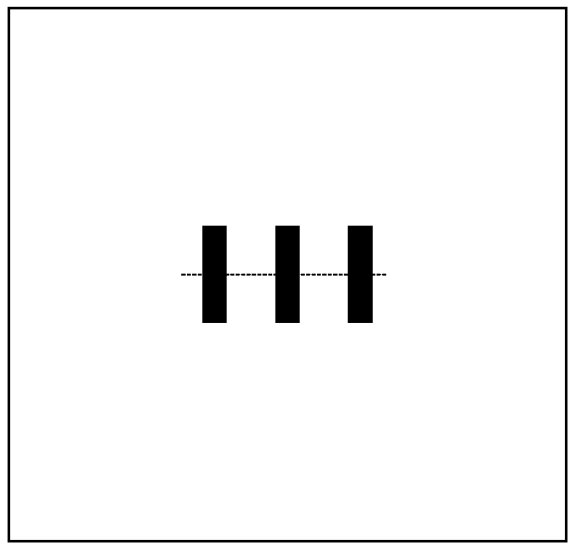
FIGS. 5A and 5B explain an image shift in a correlation calculating area on the AF sensor in the first embodiment.
Figure 5B:
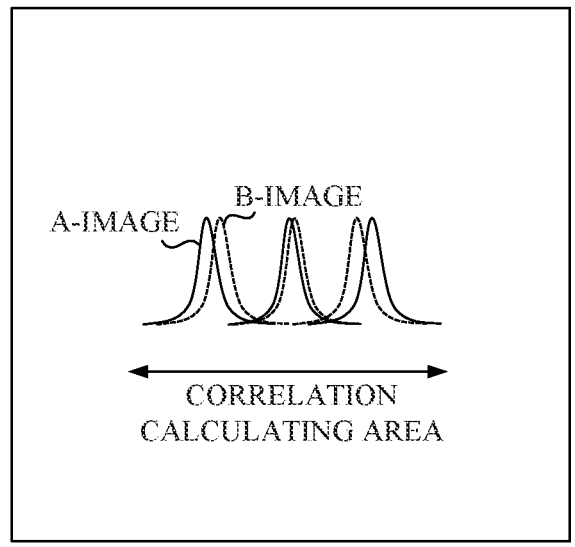

FIGS. 5A and 5B illustrate an example in which a shift amount variation between two images is so large in light of the optical and mechanical designs, and the shift amount variation cannot be ignored in the correlation calculating area. FIG. 5A illustrates objects in an image of the image display apparatus 400. FIG. 5B illustrates the signal levels of the two images in a case where the objects illustrated in FIG. 5A are imaged on the AF sensor 501, and illustrates the signal levels corresponding to the dotted line in FIG. 5A. It is understood that the shift amount between the two images at the left end, that at the center, and that at the right end in the correlation calculating area are different from one another. In this case, the correction value for the center pixel in the correlation calculating area cannot be set to the representative correction value of the entire correlation calculating area, unlike the prior art. If the correction value for the center pixel is set to the correction value for the entire correlation calculating area, for example, good focusing accuracy can be obtained for the object located at the center of the correlation calculating area but the focusing accuracy deteriorates for the objects located at the left end and right end in the correlation calculating area.

Thus, in a case where a shift amount between the two images is different for each position in the correlation calculating area, in one embodiment, the shift amount between the two images for each position in the correlation calculating area is corrected. A description will be given of a correction value acquiring procedure and correction processing for correcting a shift amount at each position in the correlation calculating area for each pixel.

Figure 6:
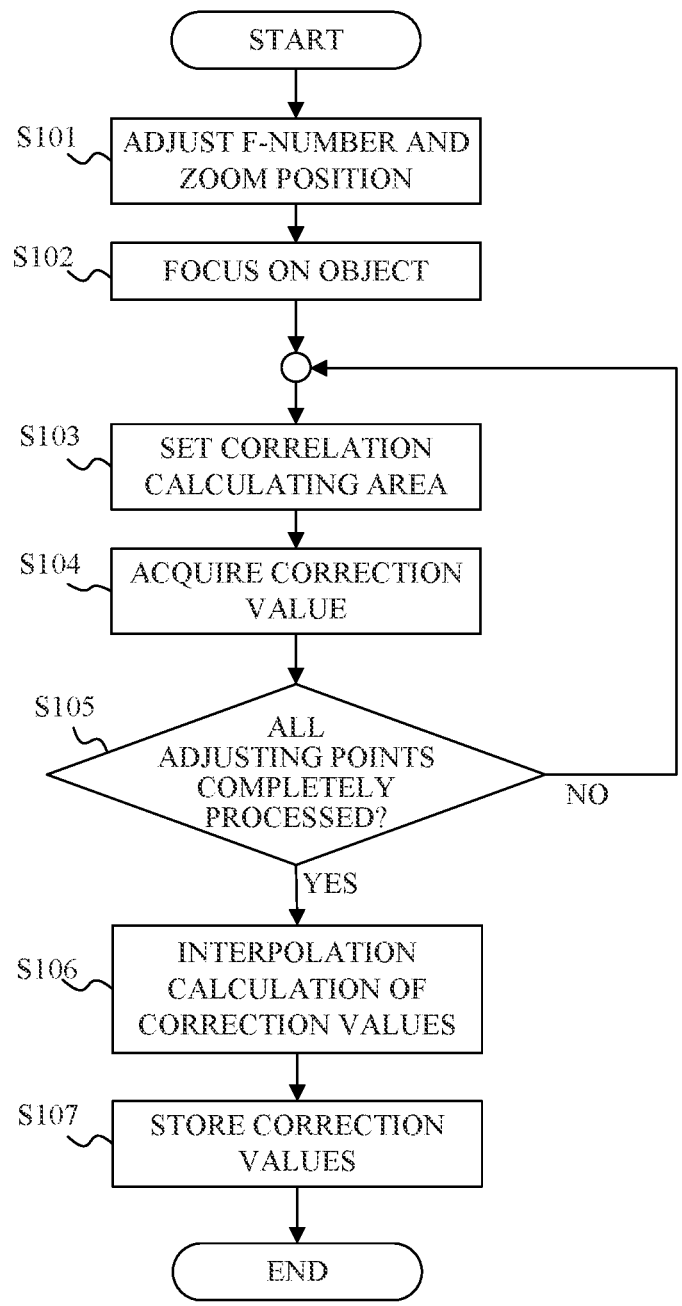
FIG. 6 is a flowchart illustrating acquiring processing of correction values in the first embodiment.

Referring now to FIG. 6, a description will be given of a correction value acquiring procedure. Each step in FIG. 6 is mainly executed by the focus detector 112 or the lens control unit 120.

First, in step S101, the lens control unit 120 adjusts the F-number of the aperture unit 103 and the position (zoom position) of the zoom lens 102. That is, the lens control unit 120 sets the aperture unit 103 to the open state and sets the zoom position to the wide-angle end. The zoom position may be set to another position.

Next, in step S102, while confirming an image on the image display apparatus 400, the user manually drives the focus lens 101 so as to focus on an object for focusing. The imaging system 10 may calculate the contrast based on image information and perform focusing on a contrast peak position.

Figures 7A, 7B:
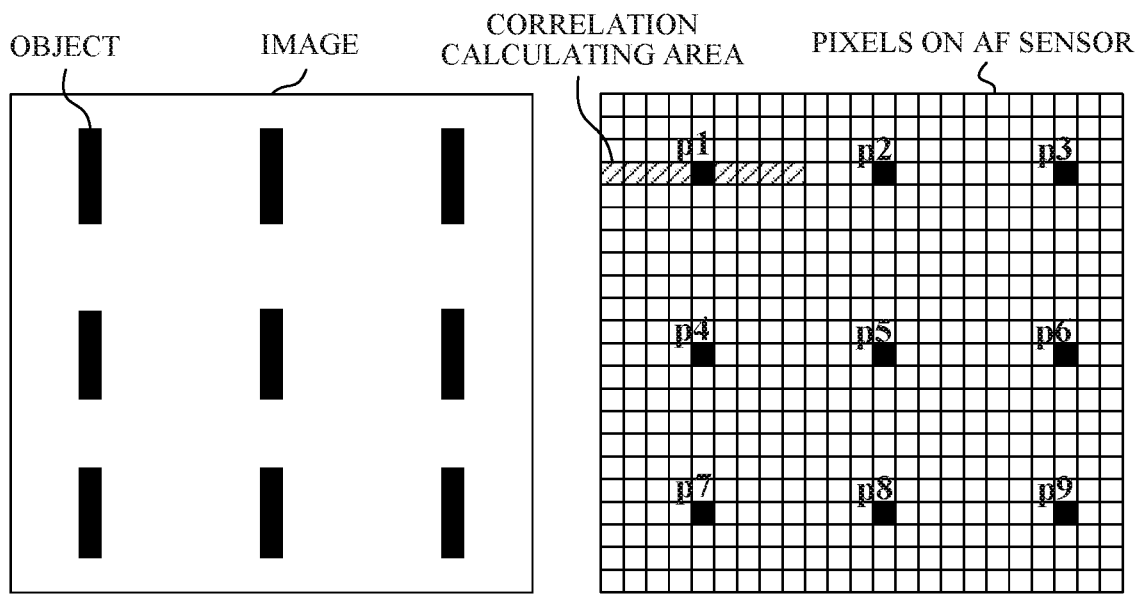
FIGS. 7A and 7B explain adjusting points for acquiring a phase difference amount on the AF sensor in the first embodiment.

Next, in step S103, the lens control unit 120 sets a correlation calculating area for calculating a phase difference amount of each adjusting point. FIGS. 7A and 7B explain adjusting points for obtaining the phase difference amount on the AF sensor 501. FIG. 7A illustrates objects (vertical bars) in an image displayed on the image display apparatus 400. The object is not limited to the vertical bar, and may be another object. FIG. 7B illustrates nine adjusting points p1 to p9 on the AF sensor 501 with black pixels. The objects illustrated in FIG. 7A correspond to the adjusting points p1 to p9 in FIG. 7B. FIG. 7B illustrates the correlation calculating area for calculating the phase difference amount of the adjusting point p1 by bevel lines (including the center black adjusting point), and sets the correlation calculating area so that the adjusting point p1 is located at the center of the correlation calculating area. The width of the correlation calculating area is determined according to the size of the object.

Next, in step S104 of FIG. 6, the sensor signal processing unit 502 outputs a pixel signal of the correlation calculating area corresponding to the adjusting point p1 set in step S103 to the correlation calculating processing unit 503. The correlation calculating processing unit 503 calculates a phase difference amount by performing correlation calculation in the correlation calculating area, and acquires the correction value.

Next, in step S105, the lens control unit 120 determines whether acquisitions of the correction values for all the adjusting points p1 to p9 have been completed. If there is an unacquired adjusting point, the flow returns to step S103 to reset the correlation calculating area corresponding to the adjusting points. In step S104, the correlation calculating processing unit 503 similarly acquires the correction value. On the other hand, in a case where the acquisitions of the correction values for all the adjusting points p1 to p9 are completed, the flow proceeds to step S106.

In step S106, the correlation calculating processing unit 503 performs interpolation calculation of correction values for pixels other than the adjusting points p1 to p9. Using the phase difference amounts of the adjusting points, the interpolation calculation calculates a phase difference amount of each pixel in the correlation direction and a direction orthogonal to the correlation direction by linear interpolation, for example. The interpolation method is not limited to linear interpolation, and may use another method such as polynomial approximation. In this embodiment, there are nine adjusting points. After the correction values of all the pixels are calculated by the interpolation calculation, the flow proceeds to step S107. In step S107, the correction value memory 504 stores the calculated correction values, and this flow ends.

Figure 8:
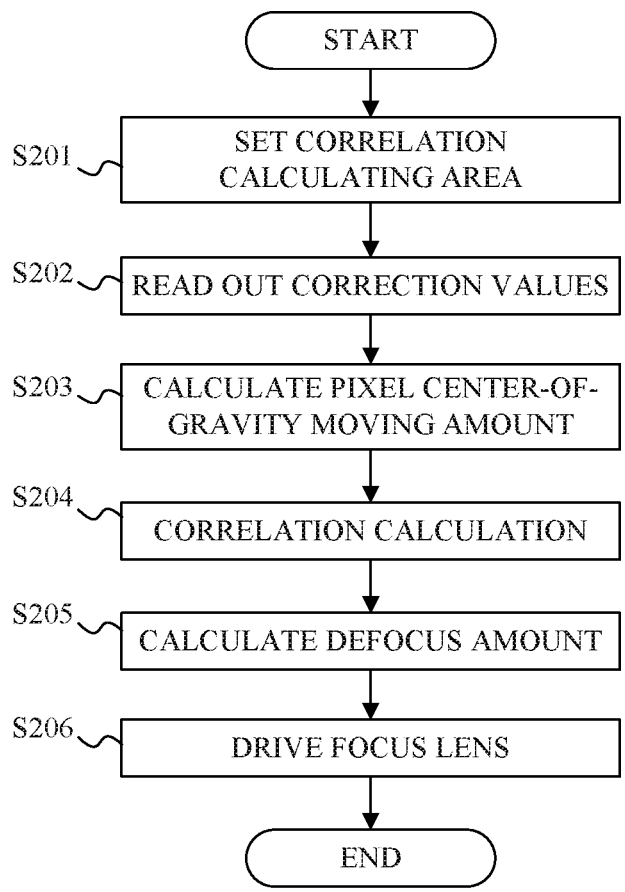
FIG. 8 is a flowchart illustrating AF processing according to the first embodiment.

Referring now to FIG. 8, a description will be given of the AF processing using the acquired correction values. FIG. 8 is a flowchart illustrating AF processing. Each step in FIG. 8 is mainly executed by the focus detector 112 or the lens control unit 120.

First, in step S201, the lens control unit 120 sets a correlation calculating area by the operation of the user operating an unillustrated operation unit. The correlation calculating area may be either one-dimensional or two-dimensional. Next, in step S202, the sensor signal processing unit 502 reads the correction values corresponding to the correlation calculating area set in step S201 out of the correction value memory 504.

Figure 9:
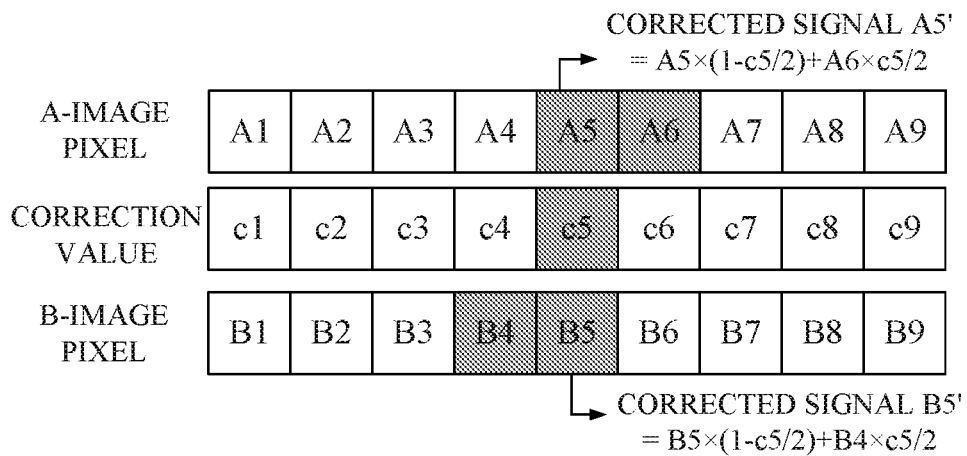
FIG. 9 explains a correcting method of a phase difference amount according to the first embodiment.

Next, in step S203, the sensor signal processing unit 502 calculates pixel center-of-gravity movement of each pixel in the correlation calculating area. Referring now to FIG. 9, a description will be given of the pixel center-of-gravity movement. FIG. 9 explains a method of correcting a phase difference amount, and corresponds to the pixels in the correlation calculating area illustrated by the bevel lines in FIG. 7B, and illustrates pixels (A-image pixels) A1 to A9, pixels (B-image pixels) B1 to B9, and correction values c1 to c9 for the respective pixel positions. A description will now be given of the corrections of the pixel A5 and pixel B5. The correction values for the pixel A5 and the pixel B5 are both c5. Similar to other pixels, the pixel number and the correction value number correspond to each other. The correction value c5 is, for example, 0.4, which means that the two images shift by 0.4 pixels. In this case, the corrected pixels A5 and B5 (signal levels) are calculated by moving the center of gravity by 0.2 pixels, which is half the correction value c5. Center-of-gravity moving directions for the pixel A5 and the pixel B5 are opposite to each other in directions that reduce or eliminate the shift amount between the two images.

A pixel A5' obtained by correcting the pixel A5 and a pixel B5' obtained by correcting the pixel B5 are calculated by the following equations (3) and (4), respectively:

$$A5'=A5\times(1-c5/2)+A6\times c5/2 \quad (3)$$

$$B5'=B5\times(1-c5/2)+B4\times c5/2 \quad (4)$$

The pixel A5 is corrected by performing a weighted sum for the neighboring pixel A6 on the right using the correction value c5. Due to the weighted sum of the neighboring pixel on the right, the center of gravity of the pixel is moved to the left. On the other hand, the pixel B5 is corrected by performing a weighted sum for the neighboring pixel B4 on the left using the correction value c5. Due to the weighted sum of the neighboring pixel on the left, the center of gravity of the pixel is moved to the right. Thus, the sensor signal processing unit 502 performs a weighted sum for a first output signal from a first pixel (such as the pixel A5 or B5) on the AF sensor 501 and a second output signal from a second pixel (such as the pixel A6 or B4) adjacent to the first pixel. The pixel center-of-gravity moving amount may have a negative sign. In that case, the pixel center-of-gravity moving directions for the A-image and the B-image may be reversed to those of the case having positive values.

Here, the A-image and the B-image are moved by half the correction value amount, but the center-of-gravity of one pixel of the A-image or the B-image may be moved. In that case, the center-of-gravity moving amount is set to c instead of c/2. Also, the weighted sum may be performed using a plurality of adjacent pixels instead of one adjacent pixel. In order to secure adjacent pixels for moving the centers of gravity of the pixels, one pixel may be added to the left end and right end of the correlation calculating area to increase the number of pixels in the correlation calculating area by two pixels.

As described above, the sensor signal processing unit 502 moves the centers of gravity of other pixels in the correlation calculating area similarly to that for the pixels A5 and B5. After the sensor signal processing unit 502 moves the centers of gravity of the pixels, the flow proceeds to step S204. In step S204, the correlation calculating processing unit 503 performs correlation calculation to calculate a phase difference amount. Next, in step S205, the correlation calculating processing unit 503 calculates a defocus amount based on the phase difference amount, and transmits the calculated defocus amount to the lens control unit 120. Next, in step S206, the lens control unit 120 calculates a focus lens driving amount based on the defocus amount, and drives the focus lens 101 (performs AF driving).

This embodiment acquires as a correction value an image shift amount at each pixel position due to lens manufacturing errors, sensor attachment errors, etc., moves the center of gravity of a pixel based on the correction value for each pixel before the correlation calculation, and corrects the image shift amount for each pixel. By correcting the image shift amount of each pixel, even if the image shift amount of each pixel varies within the correlation calculating area, the variation can be suppressed. As a result, precise focus detection can be performed even in a case where an object image is significantly distorted due to lens manufacturing errors, sensor attachment errors, or the like.

Second Embodiment

A description will now be given of a second embodiment. Those elements, which are corresponding elements to those described in the first embodiment, will be designated by the same reference numerals, and a description thereof will be omitted. The method according to the first embodiment corrects a shift amount between two images in the correlation calculating area by moving the centers of gravity of pixels. The correction that moves the center of gravity of a pixel may cause a correction error associated with the movement of the center of gravity of the pixel in a case where there is no physical pixel at that position. The correction error tends to increase as the moving amount of the center of gravity of the pixel increases.

Figure 10:
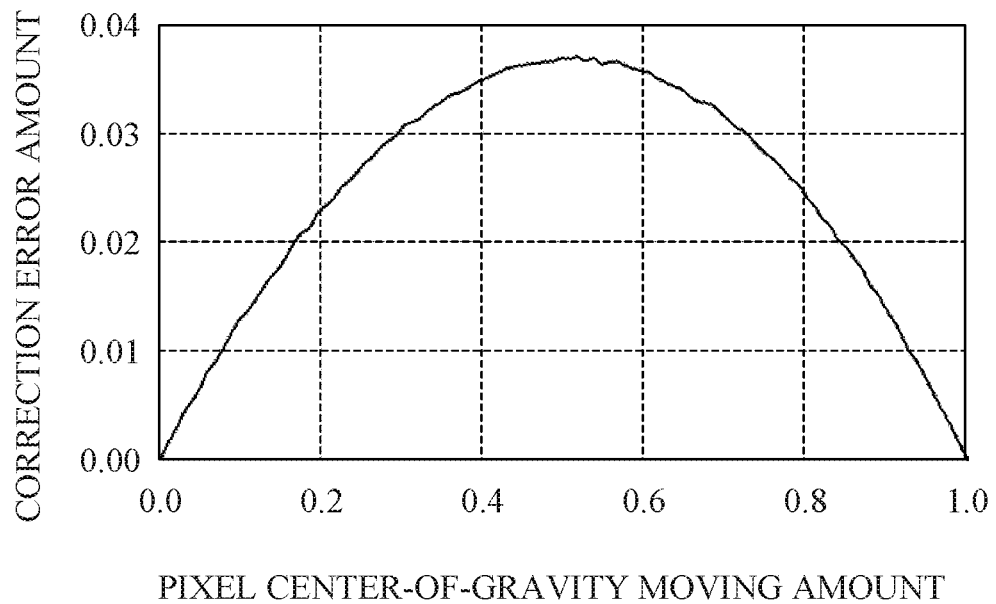
FIG. 10 illustrates a relationship between a pixel center-of-gravity moving amount and a correction error amount in a second embodiment.

FIG. 10 illustrates a relationship between a pixel center-of-gravity moving amount and a correction error amount. In FIG. 10, a horizontal axis represents the pixel center-of-gravity moving amount, and the vertical axis represents the correction error amount. As the pixel center-of-gravity moving amount increases from 0 pixel to 0.5 pixel, the correction error increases. Thereafter, as the pixel center-of-gravity moving amount increases the correction error increases from 0.5 pixels to 1 pixel, the correction error decreases. In this example, the correction error becomes maximum when the pixel center-of-gravity movement amount is 0.5 pixels. In order to reduce the correction error, it is required to make the pixel center-of-gravity moving amount as small as possible (or keep it away from 0.5 pixels). This embodiment will describe a correction processing method for suppressing the pixel center-of-gravity moving amount. In this embodiment, the correction value acquiring procedure is similar to that of the first embodiment.

Figure 11:
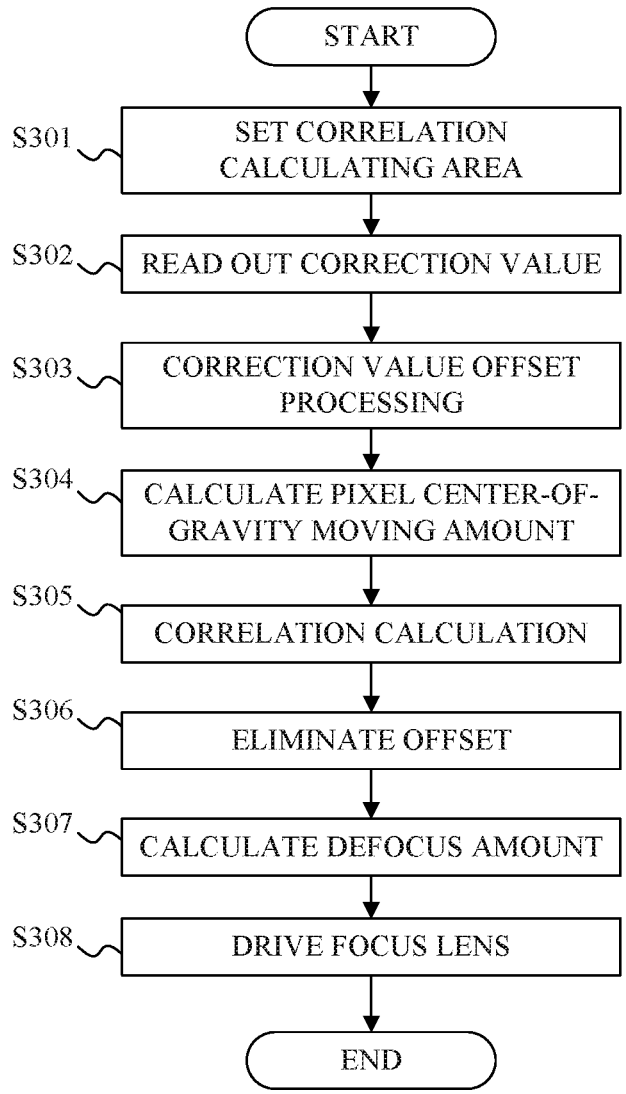
FIG. 11 is a flowchart illustrating AF processing according to the second embodiment.

Referring now to FIG. 11, a description will be given of the AF processing using the acquired correction values. FIG. 11 is a flowchart illustrating AF processing. Each step in FIG. 11 is mainly executed by the focus detector 112 or the lens control unit 120.

Steps S301 and S302 are similar to steps S201 and S202 in FIG. 8, respectively. Next, in step S303, the sensor signal processing unit 502 performs offset processing that subtracts the same value (offset amount) from the correction value (or pixel center-of-gravity moving amount) of each pixel in the correlation calculating area. That is, the sensor signal processing unit 502 searches for the maximum and minimum correction values for each pixel in the correlation calculating area, and uses the intermediate value as the offset amount.

Figures 12A, 12B, 12C, 13:
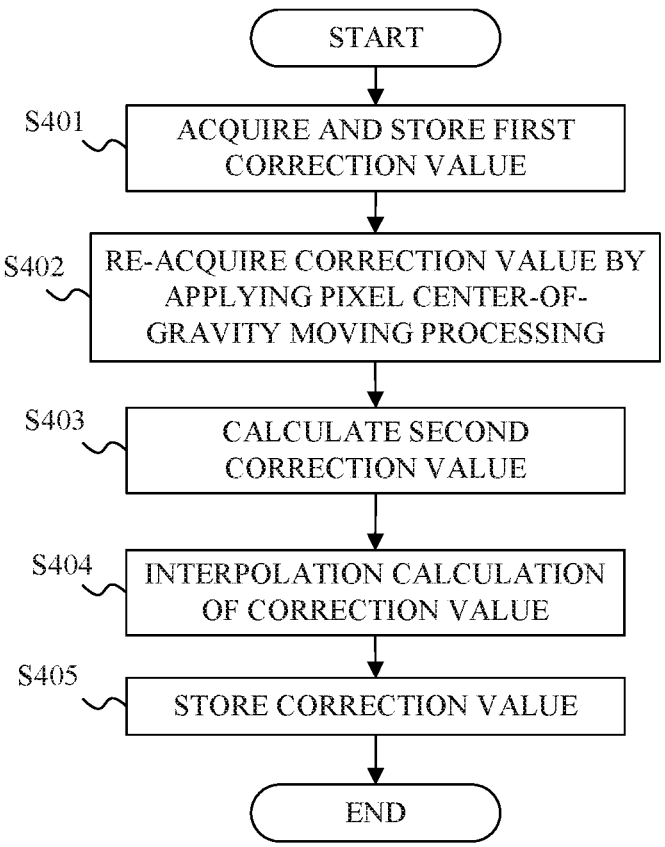
FIGS. 12A to 12C explain the post-offset pixel center-of-gravity moving amount after offset in the second embodiment.
FIG. 13 is a flowchart illustrating acquiring processing of a second correction value in a third embodiment.

FIGS. 12A to 12C explain the pixel center-of-gravity moving amount after the offset processing, illustrating a relationship between the correction value c, the pixel center-of-gravity moving amount c/2 for the A image and the B image, and the pixel center-of-gravity moving amount after the offset processing. As described in the first embodiment, half the correction value c is set as the pixel center-of-gravity moving amount of the A-image and the B-image. The offset amount is an intermediate value of 0.4 between the maximum value of 0.6 and the minimum value of 0.2 of the pixel center-of-gravity moving amounts within the correlation calculating area. The post-offset pixel center-of-gravity moving amount is generally smaller than the pre-offset pixel center-of-gravity moving amount. In a case where the correction value of each pixel in the correlation calculating area monotonously decreases and increases from the left end to the right end in the correlation calculating area, the correction value for the center pixel in the correlation calculating area may be set to the offset amount. The method of calculating the offset amount is not limited.

After the offset amount is subtracted from the correction value of each pixel, the sensor signal processing unit 502 performs steps S304 and S305 similarly to that described in the first embodiment (steps S203 and S204 in FIG. 8), and calculates a phase difference amount. Next, in step S306, the sensor signal processing unit 502 adds the offset amount to the calculated phase difference amount in order to eliminate the offset amount subtracted from each pixel in step S303. Subsequent steps S307 and S308 are similar to steps S205 and S206 in FIG. 8, respectively.

This embodiment can reduce the pixel center-of-gravity moving amount by the offset processing and suppress the correction error caused by the pixel center-of-gravity movement.

Third Embodiment

A third embodiment will now be explained. Those elements, which are corresponding elements to those described in the first and second embodiments, will be designated by the same reference numerals, and a description thereof will be omitted. In the second embodiment, the offset processing suppresses the correction error caused by the pixel center-of-gravity movement. The correction error can be suppressed by the offset processing but may remain. Accordingly, this embodiment will discuss a procedure that acquires a correction value (second correction value) for further suppressing the correction error.

FIG. 13 is a flowchart illustrating acquiring processing of a second correction value. Each step in FIG. 13 is mainly executed by the focus detector 112 or the lens control unit 120.

First, in step S401, the focus detector 112 (sensor signal processing unit 502, correction value memory 504) acquires and stores a correction value (first correction value). Step S401 is similar to steps S101 to S107 in FIG. 6.

Next, in step S402, the sensor signal processing unit 502 applies correction and offset processing using the pixel center-of-gravity moving amount based on the first correction value, and reacquires correction values for the adjusting points p1 to p9 through processing similar to steps S101 to S105 in FIG. 6. Ideally, the correction values of the reacquired adjusting points p1 to p9 are zero. However, in a case where the correction error caused by the pixel center-of-gravity movement remains, the correction value does not become zero. Accordingly, in step S403, the sensor signal processing unit 502 corrects the first correction value using the reacquired correction value and calculates a second correction value. In a case where c(p1) to c(p9) are the first correction values at the adjusting points p1 to p9 and cc(p1) to cc(p9) are reacquired correction values at the adjusting points p1 to p9, the second correction values c'(p1) to c'(p9) are represented by the following equation (5):

$$c'(p\text{—})=c(p\text{—})+cc(p\text{—}) \qquad (5)$$

("—" is a number from 1 to 9)

That is, the second correction value c' can be calculated by summing up the first correction value c and the reacquired correction value cc.

Next, in step S404, the sensor signal processing unit 502 performs interpolation processing of the correction values for pixels other than the adjusting points using processing similar to step S106 in FIG. 6 described in the first embodiment. Next, in step S405, the correction value memory 504 replaces the stored first correction value with the second correction value, and stores the second correction value.

As illustrated in FIG. 10, if the pixel center-of-gravity moving amount is known in advance, the second correction value may be determined without reacquiring the correction value at each adjusting point. For example, in FIG. 10, the correction error increases approximately linearly as the pixel center-of-gravity moving amount increases from 0 pixel to 0.5 pixel. Accordingly, in a case where the pixel center-of-gravity moving amounts in the entire area of the AF sensor 501 fall within a range from 0 pixel to 0.5 pixels, the first correction value may be multiplied by a coefficient based on a slope of the linearly approximated line, and the second correction may be determined.

This embodiment can further reduce the correction error by acquiring the second correction value.

Fourth Embodiment

A fourth embodiment will now be described. In this embodiment, those elements, which are corresponding elements to those described in the first to third embodiments, will be designated by the same reference numerals, and a description thereof will be omitted. This embodiment will discuss two-dimensional correlating calculation processing.

Figure 14:
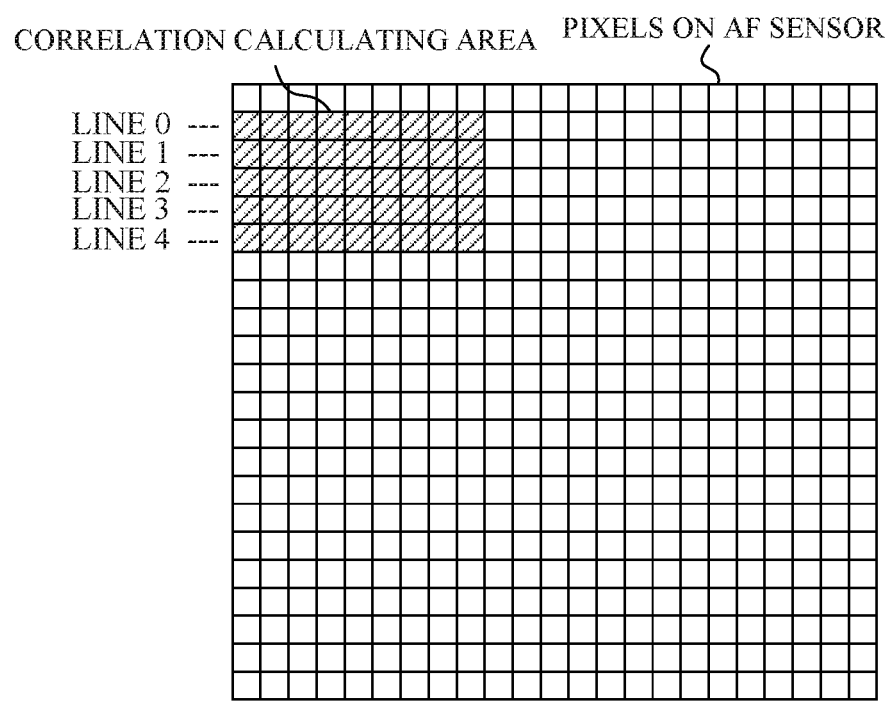
FIG. 14 explains two-dimensional correlation calculation according to a fourth embodiment.

FIG. 14 explains correlation calculation two-dimensionally. In FIG. 14, the two-dimensional correlation calculating area in each pixel of the AF sensor 501 is indicated by oblique lines. A horizontal direction in FIG. 14 is a correlation direction, and a direction orthogonal to the correlation direction is indicated by line 0 to line 4. For each line, a correlation amount COR(k) at each shift amount k between two images is calculated, and COR1(k) to COR4(k) are correlation amounts for line 0 to line 4. The correlation amounts COR1(k) to COR4(k) of these lines are added up at each shift amount, and COR_all(k) is a post-sum correlation amount. Based on COR_all(k), the phase difference amount is calculated similarly to the processing described in the first embodiment.

The processing of summing the correlation amounts and calculating a single phase difference amount in a two-dimensional correlation calculating area is well known, and has an effect of suppressing variations in the phase difference amount in a case where the illuminance of the object is low, etc. If there is a variation in the image shift amount between the two images in each line in summing up the correlation amount of each line, a correct correlation calculation result cannot be obtained. Accordingly, preliminary processing before calculating the correlation amount of each line preforms processing of correcting the image shift amount caused by the pixel center-of-gravity movement in each line. This processing can improve the accuracy of the correlation calculation result of summing up the correlation amounts, even if the distortion of the object image is significant due to the lens manufacturing error and the image shift amount is significant between lines and between pixels where the correlation amounts are summed.

As described above, in each embodiment, the control apparatus (focus detector 112) includes at least one processor and a memory coupled to the at least one processor. The memory has instructions that, when executed by the processor, perform operations as a signal processing unit (sensor signal processing unit 502) and a correlation calculating unit (correlation calculating processing unit 503). The signal processing unit is configured to perform signal processing for each of a pair of image signals from a pair of image sensors (AF sensor 501) using a correction value that is different for each pixel of the pair of image signals. The correlation calculating unit is configured to perform a correlation calculation for the pair of image signals output from the signal processing unit. The signal processing unit performs a weighted sum for adjacent pixels in a correlation calculating direction using the correction value.

In each embodiment, the signal processing unit performs a weighted sum for adjacent pixels in the correlation calculation direction using a value obtained by subtracting the offset amount from the correction value. The correlation calculating unit adds the offset amount to the phase difference amount obtained by the correlation calculation. The offset amount may be a correction value of a central pixel in the correlation calculating area, or an intermediate value between the minimum value and the maximum value of the correction values.

The control apparatus may include another memory (storage unit) (correction value memory 504) that stores the correction value. The correction value may be an actually measured value for some pixels in the pair of image sensors, and an interpolated value calculated based on the actually measured values for other pixels in the pair of image sensors.

The correction value may be used to correct the image shift amount of each pixel in the pair of image sensors. The correction value may be determined based on the phase difference amount obtained by the correlation calculation. Each of the pair of image sensors may have a two-dimensional pixel array. The signal processing unit may perform signal processing using the correction value for each pixel row in the correlation calculating direction. The correlation calculating unit may acquire the correlation amount of the image signal of each pixel row output from the signal processing unit, and sums up the acquired correlation amounts of each pixel row.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can perform precise focus detection even in a case where the object image is significantly distorted due to lens manufacturing errors, sensor attachment errors, or the like. Therefore, for example, each embodiment can provide a control apparatus, a lens apparatus, an image pickup apparatus, a control method, and a storage medium, each of which is beneficial in terms of precise focusing.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

For example, in each embodiment, the focus detector 112 is provided in the lens apparatus 100, but the disclosure is not limited to this example, and at least part of the function of the focus detector 112 (such as the AF sensor 501) may be provided to the camera body 200. Each embodiment performs focus detection using the light beam split by the splitting prism 104, but the disclosure is not limited to this example and may use (imaging-plane phase-difference AF).

This application claims the benefit of Japanese Patent Application No. 2022-056681, filed on Mar. 30, 2022, which is hereby incorporated by reference herein in its entirety.

What is claimed is:
1. An apparatus comprising:
at least one processor; and
a memory coupled to the at least one processor storing instructions that, when executed by the at least one processor, cause the at least one processor to function as:
a processing unit configured to perform signal processing for a signal from a sensor using a correction value that is different for each pixel of the signal; and a calculating unit configured to perform a correlation calculation for the signal output from the processing unit, wherein the processing unit performs a weighted sum for adjacent pixels using a value obtained by subtracting an offset amount from the correction value, and wherein the calculating unit adds the offset amount to a phase difference amount obtained by the correlation calculation.

2. The apparatus according to claim 1, wherein the offset amount is a correction value of a central pixel in a correlation calculating area of the correction value, or an intermediate value between a minimum value and a maximum value of correction values.

3. The apparatus according to claim 1, comprising another memory configured to store the correction value.

4. The apparatus according to claim 1, wherein the correction value is an actually measured value for some pixels in the sensor, and is an interpolated value calculated based on actually measured values for other pixels in the sensor.

5. The apparatus according to claim 1, wherein the correction value is used to correct an image shift amount in each pixel of the sensor.

6. The apparatus according to claim 1, wherein the correction value is determined based on a phase difference amount obtained by the correlation calculation.

7. The apparatus according to claim 1, wherein the sensor has a two-dimensional pixel array, wherein the processing unit performs the signal processing using the correction value for each pixel row, and wherein the calculating unit acquires a correlation amount for the signal of each pixel row output from the processing unit, and sums up the acquired correlation amount of each pixel row.

8. A lens apparatus comprising:
an optical system;
a sensor; and
the apparatus according to claim 1.

9. A pickup apparatus comprising:
a sensor configured to capture an image formed by an optical system; and
the apparatus according to claim 1.

10. A non-transitory computer-readable storage medium storing a program for causing a computer to execute a method, the method comprising:

performing signal processing for a signal from a sensor using a correction value that is different for each pixel of the signal; and performing a correlation calculation for the signal output from the performing signal processing, wherein the performing signal processing performs a weighted sum for adjacent pixels using a value obtained by subtracting an offset amount from the correction value, and wherein the performing the correlation calculation adds the offset amount to a phase difference amount.

* * * * *